ELECTRICAL TRANSMISSION AND STORAGE OF INFORMATION REPRESENTED BY DIRECT VOLTAGES

Filed Nov. 12, 1957

6 Sheets-Sheet 1

INVENTORS

ROBERT MATTHEWS ET AL.

BY Mawhinney & Mawhinney

ATTORNEYS

INVENTORS
ROBERT MATTHEWS ET AL.
BY Mawhinney & Mawhinney
ATTORNEYS

INVENTORS
ROBERT MATTHEWS ET AL
BY Mawhinney & Mawhinney
ATTORNEYS

INVENTORS
ROBERT MATTHEWS ET AL.
BY Mawhinney & Mawhinney
ATTORNEYS

INVENTORS
ROBERT MATTHEWS ETAL
BY Mawhinney & Mawhinney
ATTORNEYS

INVENTORS
ROBERT MATTHEWS ET AL
BY Mawhinney & Mawhinney
ATTORNEYS 3,045,071

ELECTRICAL TRANSMISSION AND STORAGE OF INFORMATION REPRESENTED BY DIRECT VOLTAGES

Robert Matthews and James Stewart Johnston, London, England, assignors to Decca Limited, a British company Filed Nov. 12, 1957, Ser. No. 695,730
Claims priority, application Great Britain Nov. 13, 1956
14 Claims. (Cl. 179—15)

This invention relates to the transmission and storage of information represented by direct voltages.

It will be appreciated that, if direct voltages are to be accurately reproduced at a distant point, they cannot simply be transmitted over a transmission line as D.C. signals or as amplitude modulations on a carrier since the transmission path will introduce attenuation and hence change the magnitude of the signals. Thus a transmission system for the distant transmission of direct voltages must convert these voltages into signals which are not affected by the transmission line and it is one of the objects of the present invention to provide an improved transmission system for this purpose which can be used for the accurate transmission of information represented by direct voltages over transmission circuits such as are used for speech transmission. Similar considerations apply to the recording of such information and it is a further object of the present invention to provide means for recording information conveyed by such direct voltage signals so that they can be accurately reproduced.

According to this invention apparatus for converting information represented by a direct voltage of varying magnitude into an alternating voltage having a frequency representative of the amplitude of the direct voltage comprises a saw-tooth generator for producing a saw-tooth signal the amplitude of which increases from a datum at a predetermined rate and comparator means arranged to compare the voltage to be converted with the saw-tooth generator output voltage and to cut-off and re-start the saw-tooth generator when the compared voltages are in predetermined relationship, whereby the saw-tooth generator produces a saw-tooth output having a repetition frequency dependent on the voltage level to be converted. From the saw-tooth output, there may be derived a sinusoidal or substantially sinusoidal output of a frequency dependent on (e.g. equal to or a muliple of) the saw-tooth frequency. Conveniently the saw-tooth output is used to produce a rectangular waveform which is subsequently filtered to provide a sinusoidal output of double the saw-tooth frequency. Such output signals can be transmitted over transmission lines or they can be recorded and, since the information is conveyed by the frequency of the signals, any waveform distortion in the transmission or recording will not affect the accuracy of the information. The original direct voltage signals may be reproduced from these output signals by means responsive to the frequency of the received signals arranged to reconvert the signals to a direct voltage dependent on the frequency.

In applying this invention to the transmission of information represented by direct voltages, apparatus for transmitting information represented by a direct voltage of varying magnitude may comprise a saw-tooth generator for producing a saw-tooth signal the amplitude of which increases from a datum at a predetermined rate and comparator means arranged to compare the voltage to be transmitted with the saw-tooth generator output voltage and to cut-off and re-start the saw-tooth generator when the compared voltages are in a predetermined relationship, whereby the saw-tooth generator produces a saw-tooth output having a repetition frequency dependent on the voltage level to be transmitted. At the receiver there are provided means responsive to the frequency of the received signals to reconvert the signals to a direct voltage dependent on the frequency. With this arrangement the voltage to be transmitted is represented by a frequency and, except for transient conditions when a change in the transmitted frequency occurs, the transmission line or other transmission circuit cannot introduce any change in the transmitted frequency, and hence cannot affect the transmission of the information. Although a saw-tooth signal is generated, the information is conveyed by the frequency of its signal and hence any distortion of the waveform by the transmission circuit is immaterial. In fact, as explained later, it may be desirable to change the waveform before it is transmitted. The aforementioned predetermined rate of rise of the saw-tooth signal is preferably linear to facilitate the accurate conversion of the frequency into a corresponding direct voltage at the receiver but it will be apparent that non-linear waveforms might be used if the receiver is arranged accordingly. Most conveniently the comparator means are arranged to cut off and re-start the saw-tooth generator when the compared voltages are equal.

The actual frequencies employed are determined by the rate of rise of the saw-tooth signal and, by suitable choice of the rate, the range of frequencies to be transmitted can be chosen as required. These frequencies may readily be arranged to lie in an audio frequency range so that the signals can be transmitted over speech circuits. Conveniently for this purpose the reproduction frequencies are arranged to lie between 300 and 3000 cycles per second.

The aforementioned saw-tooth generator may comprise a high gain amplifier with a capacitive feedback connection from the output to the input and a resistive input circuit which is connected to a source of reference voltage whereby the amplifier with its feedback and input circuits forms a Miller integrator producing a linear saw-tooth voltage output rising at a rate proportional to the applied reference voltage.

For many transmission line circuits, for example if telephone speech circuits are employed, it is desirable to eliminate or reduce the higher frequencies so as to minimise the possibility of cross talk. Similarly in recording signals, the recording apparatus may have only a limited frequency range and it may be desirable to avoid applying the higher frequency signals to the recording apparatus. For these reasons the output of the saw-tooth generator is preferably converted into a substantially sinusoidal form. One means for doing this comprises circuit means arranged to produce a trigger impulse from each saw-tooth wave, a bi-stable multivibrator producing rectangular waveform output pulses, means for applying said trigger impulses to said bi-stable multivibrator and a low pass filter connected to said bi-stable multivibrator for producing a substantially sinusoidal waveform the frequency which is half the saw-tooth repetition frequency. The circuit means for producing a trigger impulse may conveniently comprise a monostable flip-flop triggered by the output of said comparator and the trigger impulse produced by this flip-flop may be used to cut-off and re-start the saw-tooth generator as well as to trigger said bi-stable multivibrator.

As previously indicated, the apparatus of the present invention may also be used in combination with recording means for recording the alternating voltage output and thus it is possible to provide a record representative of direct voltage levels. The recording may conveniently be effected on magnetic tape by means of a magnetic tape recorder since the alternating frequencies can be arranged to be within the audio range. It will be readily apparent however that such alternating signals may be recorded on other forms of recording media. To reproduce the direct voltage levels there may be provided playback means for reproducing the recorded alternating voltages and means responsive to the frequency of the reproduced signals to reconvert the signals to the direct voltage dependent upon the frequency.

If the recording is effected on a medium, such as magnetic tape, which is mechanically traversed past a reproducing head, to ensure correct reproduction of the frequencies recorded and hence of the direct voltage input levels, a synchronising signal may be recorded on the medium. This synchronising signal might be of a standard reference frequency, for example a 50 cycles per second alternating mains supply frequency recorded on a separate recording channel on the medium or it might be a readily identifiable signal in a multiplex channel. As an example of the latter arrangement, if the normal range of voltages to be recorded was ±50 volts and *n* such signals were to be recorded, the recording system might be arranged to record n+1 channels, the extra channel being representative of a predetermined voltage level, e.g. +60 volts, so that this last channel would provide both synchronisation and a reference level. Thus, if for example the recording medium was magnetic tape and the tape was played back at the wrong speed, this last channel would enable the correct voltage level to be established.

At a receiver for reconverting to a direct voltage the alternating voltage signals (e.g., the signals transmitted over a line or reproduced signals reproduced from a recording), there may be provided an integrator producing a saw-tooth waveform the amplitude of which increases from a datum at a predetermined rate, means for controlling the saw-tooth repetition frequency in accordance with the frequency of the alternating input signals and circuit means providing an output representative of the peak voltage of the integrator output. In one arrangement, a receiver comprises a shaping circuit for converting the receiver input signals into repetitive pulses synchronised with the frequency of the input signals, an integrator producing a saw-tooth waveform the amplitude of which increases from a datum at a predetermined rate, switch means for said integrator controlled by the repetitive pulses so that said integrator produces waveforms increasing to a potential dependent on the frequency of the input signals, and a pulse sampling demodulator providing an output representative of the peak voltage of the integrator output. If the direct voltages are to be reproduced linearly proportional to the input direct voltages at the transmitter, the integrator must produce a saw-tooth waveform similar to that provided by the saw-tooth generator at the transmitter and most conveniently linear waveforms are employed at the receiver as well as at the transmitter.

The invention also includes within its scope apparatus for converting alternating voltage input signals of a varying frequency into a direct voltage of a magnitude representative of the frequency of the input signal comprising a shaping circuit for converting the input signals into repetitive pulses synchronised with the frequency of the input signals, an integrator producing a saw-tooth waveform the amplitude of which increases from a datum at a predetermined rate, switch means for said integrator controlled by the repetitive pulses so that the integrator produces waveforms increasing to a potential dependent on the frequency of the input signals, and a pulse sampling demodulator providing an output representative of the peak voltage of the integrator output.

The aforementioned integrator may comprise a high gain amplifier with a capacitive feedback connection from the output to the input and a resistive input circuit connected to a source of reference voltage whereby this reference voltage is applied to the amplifier input so that the amplifier with its feedback and input circuits forms a Miller integrator producing a linear saw-tooth voltage output rising at a rate proportional to the applied reference voltage.

The aforementioned shaping circuit may comprise a squarer to reconvert the input signals into a rectangular waveform, a first self-timing monostable flip-flop triggered by the leading or trailing edge of the rectangular waveform to produce a short duration pulse for controlling the pulse sampling demodulator and a second self-timing monostable flip-flop triggered by the trailing edge of the output pulse of the first flip-flop for cutting off and restarting the integrator.

The information transmitting system described above may readily be used for multi-channel operation either on a frequency-sharing or on a time-sharing basis. In the former case, a frequency range may be allocated for each channel and band pass filters used at the receiver to separate the incoming signals into the separate channels. If time-sharing multi-channel operation is required, sequential switching at low frequency may be effected in synchronism at the transmission and receiving stations, for example, by using a mains electricity supply if synchronised mains are available at the two stations, or by a low frequency synchronising signal transmitted over the transmitting system. One method of effecting simultaneous commutation at the receiver and the transmitter is by the use of gas-filled counting tubes such as are known under the name "Dekatron" to effect switching from channel to channel in synchronism. If such tubes are used, to ensure the appropriate channel is selected, a resetting signal which may, for example, be a signal outside the normal range used for signalling (and hence transmitted as a frequency outside the normal frequency range and separable by filters from the other signals) may be sent from the transmitting station to the receiving station and, after separation from the other signals, applied as a re-setting pulse to a particular cathode of the tube. Such a re-setting pulse would be sent out once in each cycle of operation of the cathodes of the counting tube to put the counting tube back into step if, for any reason, it should have gone out of step.

Similarly a number of direct voltages may be recorded on a single recording medium, for example a single magnetic track by frequency multiplexing or time-multiplexing in a similar way to that described above for transmitting information about a number of voltages over a single communication circuit.

The apparatus of the present invention has particular application to the transmission and recording of interscan markers in a radar display system employing interscan markers of the kind described in United States Patent No. 2,849,708, granted August 26, 1958. In that specification there is described an interscan marker system in which the directions and starting positions of the markers are controlled by direct voltages and hence, by recording these direct voltages the positions of the interscan markers may be recorded. These interscan markers may, for example, be tracking markers manually adjusted, possibly with rate-aiding, to follow the position of a target in radar display, or they may be automatically controlled to follow the position of a target as, for example, in the manner described in co-pending United States Specification No. 678,890, filed August 19, 1957. Such interscan markers may be used, when made to follow targets on a radar display, to transfer the target position information and also possibly other information to an auxiliary display showing selected information and, in such a case, the apparatus of the present invention permits of this information being transmitted to a remote display or of a permanent record being made of the information without requiring any extra operation other than the necessary manual or automatic varying of a track marker which is required for putting the information on the auxiliary display.

In the following description reference will be made to the accompanying drawings in which.

Figure 7:
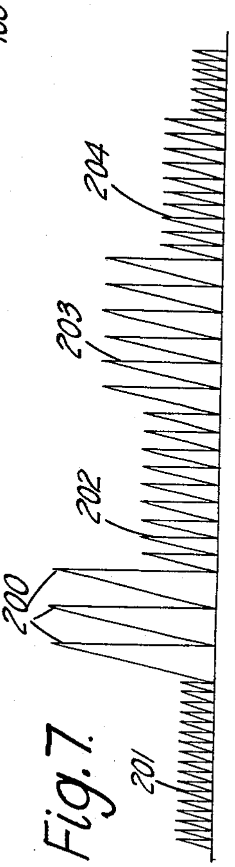
Figure 6A:
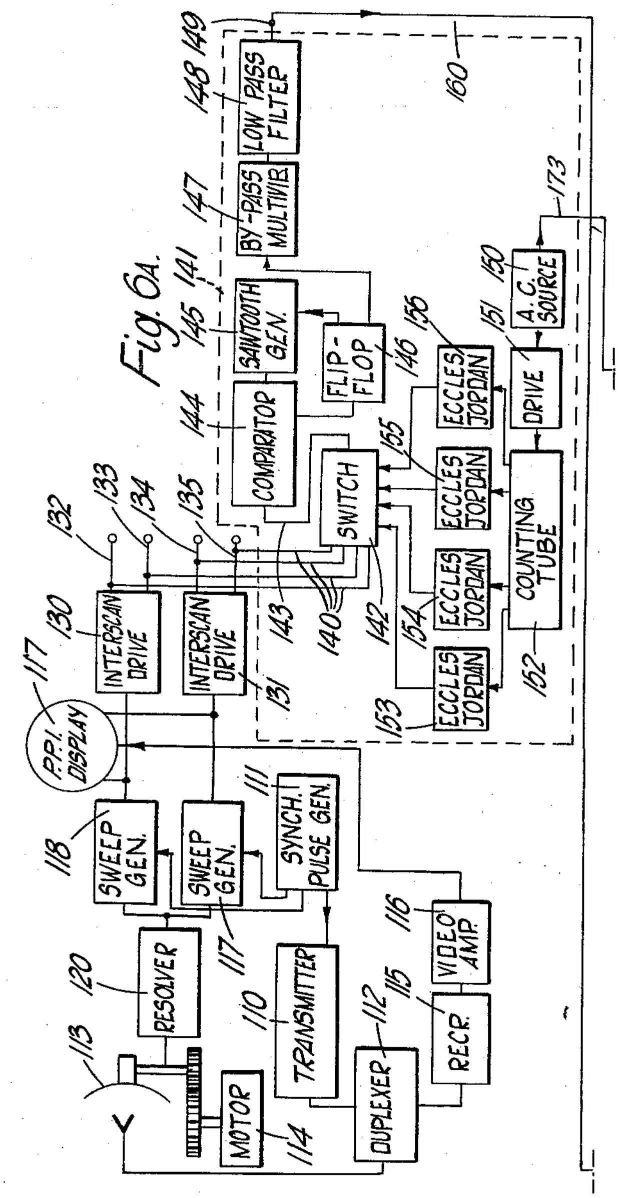
Figure 6B:
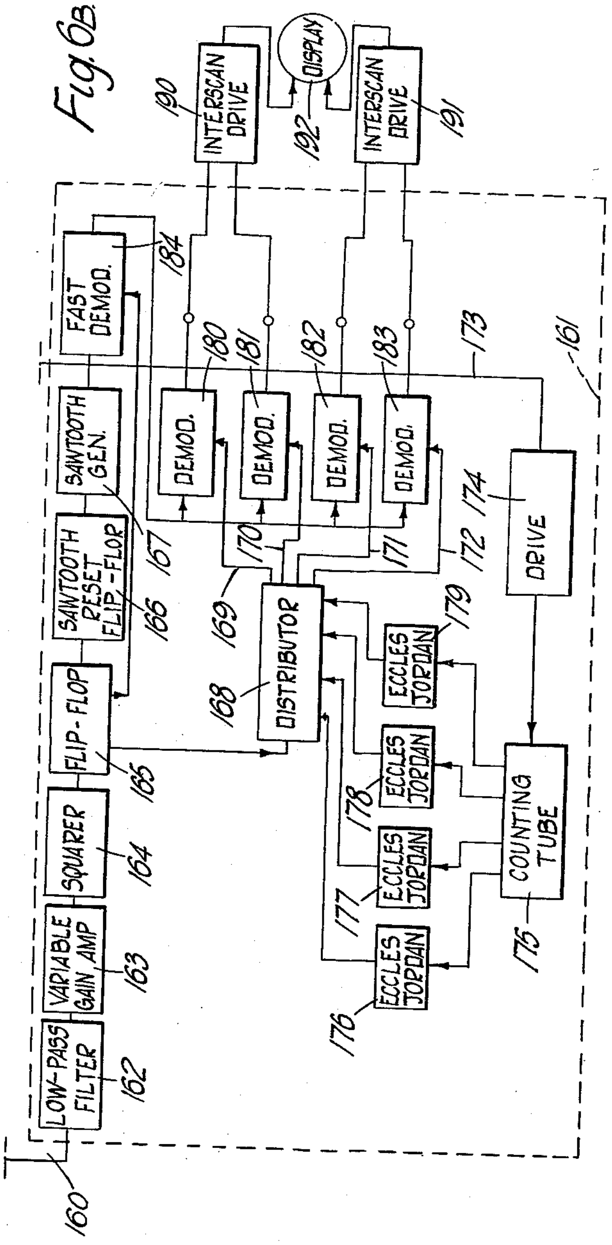

FIGURES 6A and 6B taken together are a diagram illustrating a time multiplex system for transmitting and remotely displaying information about a plurality of interscan markers on a radar plan position indicator;

FIGURE 7 is a waveform diagram; and

Figure 9:
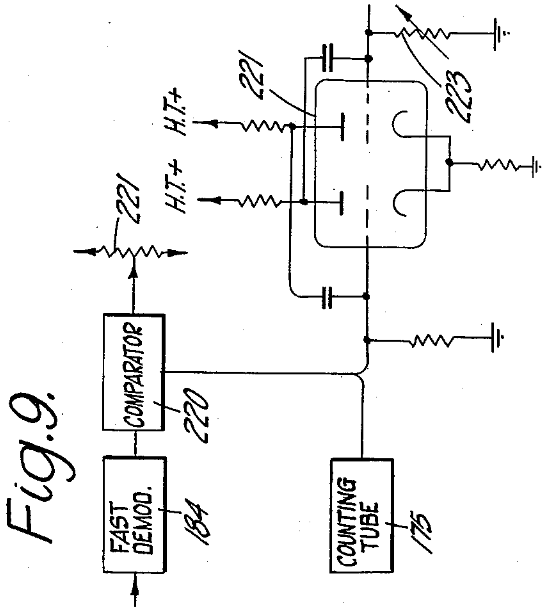
Figure 8:
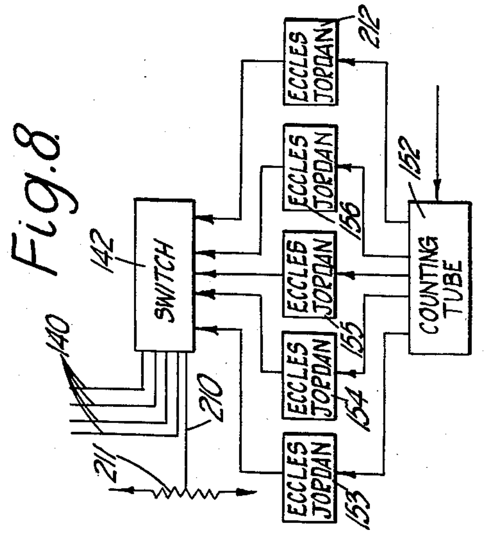

FIGURES 8 and 9 are diagrams illustrating parts of a synchronising system.

Figure 1:
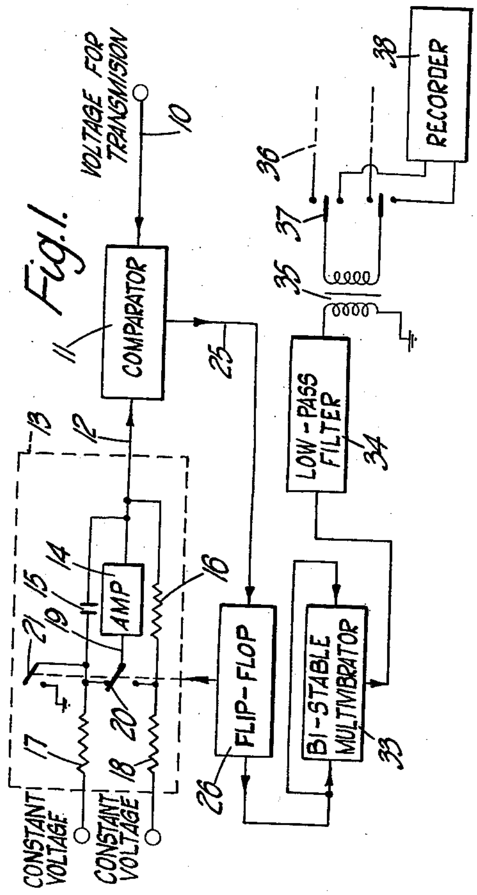
FIGURE 1 is a diagram illustrating a transmitting apparatus for converting a direct voltage of varying magnitude into alternating voltages of a frequency representative of the magnitude of the direct voltage.

FIGURE 1 illustrates an apparatus for converting a direct voltage of varying magnitude into an output signal having a frequency representative of the magnitude of the direct voltage. The voltage to be converted, which for convenience is considered as a voltage with respect to earth, is applied to an input terminal 10 which is connected to one input of a voltage comparator 11. The other input to this voltage comparator, which is described below, is taken from the output circuit 12 of a saw-tooth voltage generator 13. This saw-tooth voltage generator comprises a high gain amplifier 14 having a feedback capacitor 15 and a feedback resistor 16. Associated with the capacitive feedback circuit 15 is an input resistor 17 and associated with the resistor feedback circuit 16 is an input resistor 18. The two feedback circuits are permanently connected to the output of amplifier 14 and to the aforementioned output circuit 12. The input 19 to the amplifier is switchably connected by means of an electronic switch 20 to either the junction of the feedback capacitor 15 and the input resistor 17 or the junction of the feedback resistor 16 and the input resistor 18. The switch 20 is operated simultaneously with a second electronic switch 21 which serves to earth the input side of the capacitor 15 when the switch 20 connects the input to the amplifier to the junction of resistors 16, 18. When the switch 20 is set so that the feedback and input circuit comprising capacitor 15 and resistor 17 is operative, the amplifier operates a Miller integrator to generate a linear saw-tooth voltage having a very high degree of linearity provided the amplifier 14 has a high gain. This saw-tooth voltage starts from the level to which the capacitor 15 has previously been charged. This level is determined by the voltage applied to the input resistor 18 when the switch is in the other condition in which condition the amplifier 14 with resistors 16, 18 acts as a see-saw circuit so that the potential at the output circuit 12, and hence the potential to which the capacitor 15 is charged, varies as the potential applied to the input resistor 18 but in the opposite direction, the ratio of the input and output potentials being equal to the ratio of the magnitudes of the input and feedback resistors 18 and 16. In the arrangement of the present invention, constant direct voltages are applied to the input resistors 17 and 18 so that the integrator 13 produces a saw-tooth waveform having a fixed slope and starting from a fixed datum level.

Figure 2:
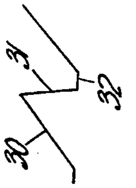
FIGURE 2 is an explanatory waveform diagram.

The comparator 11 is arranged to produce an output pulse when the saw-tooth waveform level is equal to the voltage applied to the input terminal 10. This comparator may comprise, for example, two grid-controlled valves having their cathodes connected to a common cathode load of high impedances to form what is known as a "long-tailed pair"; the two voltages to be compared are applied respectively to the control grids of the two valves one or other of which will conduct according to which has the higher grid voltage. The comparator is arranged to produce an output voltage in an output circuit 25 as soon as the saw-tooth voltage exceeds the applied input voltage and this output voltage is fed to a monostable self-timing flip-flop circuit 26 which produces a short duration impulse used for re-setting the saw-tooth voltage generator by controlling the switches 20, 21. The output of the saw-tooth generator is thus of the form shown in FIGURE 2 in which there is a sloping waveform 30 having a slope controlled by the reference voltage applied to the input resistor 16. This slope is rapidly terminated as indicated at 31 when the saw-tooth is re-set. There is then a short interval 32 before the start of the next saw-tooth impulse, this interval corresponding to the duration of the re-setting impulse from the flip-flop. This interval is made as short as possible but, as will be explained later, compensation for this interval can be effected at the receiver so that it does not affect the accuracy of the system. It will be seen that, neglecting this short interval 32, the saw-tooth waveform has a duration which is directly proportional to the voltage applied to the input terminal 10 and thus the repetition frequency of the sawtooth output is proportional to this applied voltage. Since the saw-tooth generator is re-set as soon as the flip-flop 26 is operated, the output of the comparator 11 comprises relatively short duration pulses of the same repetition frequency as the saw-tooth waveform output. The output of the flip-flop 26 has this same repetition frequency and is used to provide the required output signals. For this purpose the short duration impulses from the flip-flop 26 are fed to a bi-stable multivibrator 33, e.g. an Eccles-Jordan circuit, giving rectangular waveform output pulses having a pulse duration half the pulse repetition period, this bi-stable multivibrator 33 being set in one condition by one impulse from the flip-flop 26 and set in the other condition by the next successive impulse. These output pulses from the bi-stable multivibrator 33 are passed through a low pass filter 34 to provide an output of substantially sinusoidal waveform. This waveform may then be applied to a transmission line as an alternating voltage without any direct voltage component, for example by means of a transformer 35 feeding the output from the filter 34 to a transmission line 36. If it is desired to record the output pulses they may be fed from the transformer 35 to a recorder, e.g. a magnetic tape recorder, and in FIGURE 1 there is illustrated diagrammatically a switching device 37 for feeding the output from the transformer 35 either to a recorder 38 or to the transmission line 36 for transmitting the output to a distant point. It will be understood that if desired the recorder might be operated at the same time as the signals are being transmitted.

The frequency of the output signals is determined by the repetition rate of the saw-tooth generator and, since the slope of the waveform is determined, inter alia, by the voltage applied to the input resistor 17, it is readily possible by suitable choice of this voltage to adjust the saw-tooth generator to give output signals of any desired band of repetition frequencies for any required range of input voltages. The apparatus is preferably arranged so that the output frequencies are in the audio frequency band, for example, in a band of 300 to 3000 cycles per second. Such signals may very conveniently be transmitted over telephone speech circuits and may readily be recorded using a magnetic tape recorder.

Figures 3, 4:
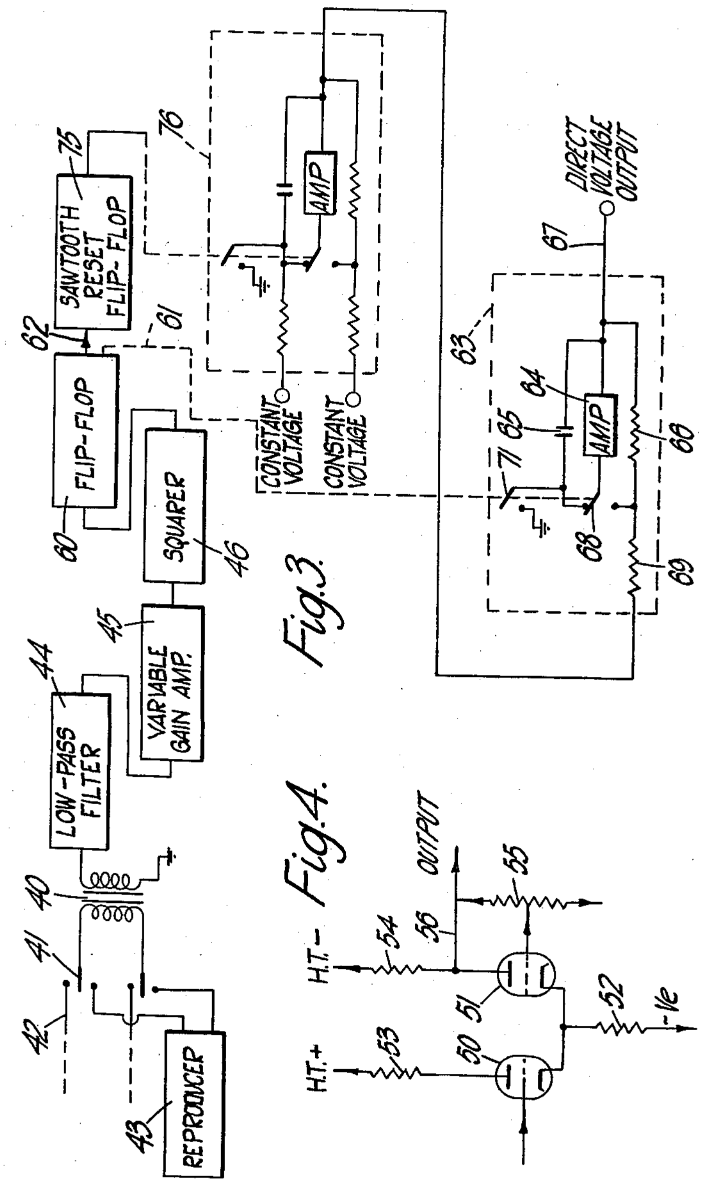
FIGURE 3 is a diagram illustrating a receiving apparatus for reconverting the signals from the system of FIGURE 1 into direct voltages.
FIGURE 4 is a simplified circuit diagram of one part of the apparatus of FIGURE 3.

FIGURE 3 illustrates a receiver for reconverting the alternating voltage output from the apparatus of FIGURE 1 into direct voltages having a magnitude dependent on the frequency of the alternating voltage. In FIGURE 3 there is illustrated diagrammatically an input transformer 40 which can be connected by means of a switch 41 either to a transmission line 42 for receiving signals direct from a transmitter such as that shown in FIGURE 1 or to a reproducer 43 for reproducing signals recorded by a recorder such as the recorder 38 in FIGURE 1. The output from the transformer 40 is fed through a low pass filter 44 to a variable gain amplifier 45 and thence into a squarer 46 which converts the substantially sinusoidal output of the amplifier 45 into a rectangular waveform. This squarer might consist simply of a limiting circuit limiting both the positive and negative going excursions of the signal voltage so as to produce a substantially rectangular waveform; if the limiting were symmetrical about the mean voltage level, the output would be a square waveform having substantial unity mark to space ratio but this is not essential since the principal purpose of the squarer is to ensure that there is a steep positive-going (or negative-going) edge present in the waveform once but only one in each cycle. Alternately this squarer 46 might comprise a circuit such as is shown diagrammatically in FIGURE 4 comprising two grid-controlled valves 50 and 51 having their cathodes connected together with a common cathode impedance 52 of high magnitude to form a "long-tailed pair." The anode circuits of the valves 50, 51 include load resistors 53, 54 respectively and the input signal is applied to the control grid of the valve 50. The control grid of the valve 51 is connected to a source of reference potential illustrated as a tap on a potentiometer 55. With this arrangement, when the alternating voltage input signal potential exceeds that on the grid of valve 51 determined by the setting of the potentiometer 55, the valve 50 will conduct heavily whilst, when the input signal potential is below the potential on the grid of the valve 51, the valve 50 will be cut-off. Thus square waves are developed at the anodes of the valves 50 and 51 and the output may be taken from either of these two anodes, for example by means of an output circuit 56 connected to the anode of valve 51, to give a rectangular pulse waveform. If the potentiometer 55 is adjusted so that the potential applied to the grid of the valve 51 is the mean potential of the alternating input signals applied to the grid of the valve 50, then this waveform will have a unity mark to space ratio. This rectangular waveform is applied to a self-timing monostable flip-flop circuit 60 (FIGURE 3) which produces short duration output pulses in two output circuits 61, 62, these pulses occurring once in each cycle of the rectangular waveform at a point where the voltage changes rapidly. The pulses in the circuit 61 are fed as control signals to a pulse sampling demodulator 63 which comprises a high gain amplifier 64 having a first feedback circuit formed by a capacitor 65 and a second feedback circuit formed by a resistor 66 which feedback circuits are both permanently connected to the amplifier output 67. An electronic switch 68 connects the amplifier input alternatively either to the junction of the feedback resistor 66 and an input resistor 69 or to the feedback capacitor 65. The switch 68 is ganged with a second electronic switch 71 for earthing the input end of the capacitor 65 when the feedback resistor 66 is operative and the two electronic switches 68, 71 are controlled by the pulses from the output circuit 61 of the flip-flop 60 so that for a short period once in each cycle of the alteranting voltage input to the receiver the resistive feedback and resistive input circuits are connected to the input to the receiver.

The output circuit 62 from the flip-flop 60 is connected to a second monostable self-timing flip-flop 75 which is triggered by the trailing edge of the output from the flip-flop 60 and which produces short duration impulses. These impulses are applied as switching impulses to a saw-tooth generator 76, which is similar in construction to the saw-tooth generator 13 of FIGURE 1, and the impulses thus serve to re-set the saw-tooth generator periodically at the frequency of the alternating voltage input signals to the receiver. The output waveform of the saw-tooth generator 76 is thus similar to that illustrated in FIGURE 2 and this output is applied to the aforementioned input resistor 69 of the pulse sampling demodulator 63. The output pulses from the flip-flop 60 occur just before the peak of each saw-tooth wave and these output pulses switch the pulse sampling demodulator so that the input resistor 69 and feedback resistor 66 are connected into circuit thereby causing the voltage level in the output circuit 67 rapidly to become representative of the instantaneous level of the saw-tooth voltage. At the end of each sampling pulse the switches 68, 71 revert to connect the feedback capacitor 64 into circuit so that the amplifier acts as a Miller integrator with zero rate of change of output voltage so thereby holding this output voltage until the next sampling pulse.

Since the slope of the saw-tooth waveform from the generator 76 and the datum level for the starting of the waveform are constants determined by the reference voltages applied to the two input circuits of the saw-tooth generator 76, the output voltage sampled by the pulse sampling demodulator 63 is thus representative of the duration of the saw-tooth waveform and hence is dependent on the frequency of the incoming signals. If this frequency should change, the output voltage from the demodulator 63 will immediately follow such a change since it is dependent on the duration of each separate saw-tooth waveform. By suitably choosing the duration of the impulses from the flip-flop 75 to correspond to the duration of the impulses from the flip-flop 26 in the transmitter of FIGURE 1, taking account of the fact that the saw-tooth waveform frequency at the receiver is twice that at the transmitter, the effect of the short intervals 32 (FIGURE 2) in the saw-tooth waveforms at the transmitter and receiver are cancelled. However, the duration of these impulses may be made so short that the effect of these intervals in any case may be negligible.

It will be seen that the receiver of FIGURE 3 produces an output direct voltage which corresponds to the input direct voltage at the transmitter. The ratio of the magnitudes of these voltages may be adjusted if necessary by adjusting the reference potential controlling the waveform slopes of the saw-tooth generators 13 and 76. A signal representative of a fixed direct voltage input may be transmitted periodically to enable the reference voltages at these saw-tooth generators in the transmitter and receiver to be set so that the output voltage is exactly equal to the input voltage.

It is thus possible to reproduce at the receiver the direct voltages applied to the transmitter. Positive or negative voltages may be transmitted without modification of the equipment merely by altering the reference potentials.

Figure 5:
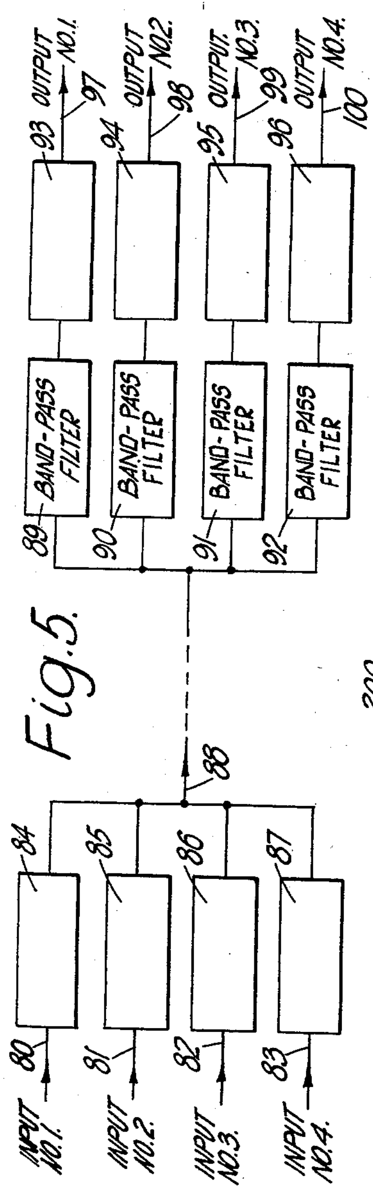
FIGURE 5 is a block diagram illustrating a frequency multiplex transmitting and receiving system for transmitting information about a plurality of direct voltages.

The information transmitting system described above may be used for multi-channel operation either on a frequency-sharing or on a time-sharing basis. A frequency multiplex system is illustrated diagrammatically in FIGURE 5 in which there are shown four input channels, 80, 81, 82, 83 carrying direct voltages to be transmitted. These four voltages are fed respectively to four transmitters 84, 85, 86, 87 each of which is similar to the transmitting device illustrated in FIGURE 1 and produces a sinusoidal output signal having a frequency representative of the level of the direct voltage input. The reference potentials of the saw-tooth generators of the four transmitters are adjusted, however, so that the output signals lie in separate frequency bands. These signals may then be fed over the transmission circuit 88 and subsequently separated by four band-pass filters 89, 90, 91, 92 and fed respectively to four separate receivers 93, 94, 95, 96 which may each be similar to the receiver illustrated in FIGURE 3 and which feed respectively four output channels 97, 98, 99, 100. Thus the four receivers will reproduce the four direct voltage inputs in the four output channels 97–100. The frequency multiplexing arrangement of FIGURE 5 can also be used in a system in which the signals from the transmitters are recorded and are subsequently reproduced provided the recording equipment has a bandwidth sufficient to accommodate the full frequency range employed by all the transmitters.

As previously indicated, multi-channel operation can also be effected by using a time-sharing system and FIGURES 6A and 6B illustrate diagrammatically one such system arranged for transmitting and reproducing four direct voltages representative of the positions of interscan marker traces occurring between radar traces on a radar plan position indicator. Such interscan markers are described and claimed in United States Patent No. 2,849,708, granted August 26, 1958. Referring to FIGURE 6A there is illustrated diagrammatically a pulse radar system comprising a transmitter 110 arranged to produce short duration radio frequency pulses of a microwave frequency under the control of a synchronising pulse generator 111. These pulses from the transmitter 110 are fed through a duplexer 112 to a directional scanning antenna 113 which is rotated in bearing by means of a drive motor 114. Echoes of these transmitted pulses reflected from distant targets, atfer being received by the antenna 113, are fed through the duplexer 112 to a receiver 115 and thence to a detector and video amplifier stage 116 to provide video output signals which are applied as a brightness modulation to a cathode ray plan position indicator display tube 117. This display tube has fixed orthogonal deflector means, e.g. deflector coils, and the deflections of the cathode ray beam in two orthogonal directions are controlled respectively by two sweep generators 118, 119 producing saw-tooth deflection signals synchronised with the output of the synchronising pulse generator 111 and having slopes controlled in accordance with the sine and cosine of the angular position of the antenna 113 by means of a bearing resolver 120 rotated in synchronism with the antenna. The arrangement thus far described constitutes a known type of pulse radar apparatus having a plan position display. This plan position indicator display also has marker traces produced by deflection of the cathode ray beam during the intervals between the radar display scans by means of interscan signal waveform generators 130, 131 associated respectively with the two orthogonal deflector means. As previously mentioned, such an interscan marker system is described in United States Patent No. 2,849,708, granted August 26, 1958. The interscan marker waveform generators may conveniently each comprise a waveform generating circuit similar to the saw-tooth generators 13 of FIGURE 1 having two direct voltage inputs which control respectively the rate of scan and the datum level from which the scan starts. The direct voltage input circuits for the two interscan waveform generators 130, 131 are shown at 132, 133, 134, 135 in FIGURE 6A. The present invention is concerned more particularly with the transmission of these voltages to a remote point and is not concerned with the production of these voltages. These voltages may, for example, be arranged to cause a marker trace to follow automatically the position of a selected target as, for example, is described in co-pending United States specification No. 678,890, filed August 19, 1957.

The four direct voltages to be transmitted are fed respectively by means of four leads 140 to a transmitting unit 141. In this transmitting unit the four voltages are applied to an electronic switch 142 which, in a method to be described later, switches the four voltages in sequence to a circuit 143 feeding a voltage comparator 144. This voltage comparator can be similar to the voltage comparator 11 in FIGURE 1 and compares the applied voltage from one of the leads 140 with the output from a saw-tooth generator 145 of which the saw-tooth waveforms are periodically cut-off and re-started by a monostable flip-flop 146. The flip-flop is triggered by the output of the comparator 144. The output from this flip-flop is also used to trigger a square wave generator 147 to produce a square wave output which is fed through a low-pass filter 148 to an output terminal 149. The saw-tooth generator 145, flip-flop 146, square wave generator 147 and low-pass filter 148, may be identical with the corresponding units 13, 26, 33 and 34 of FIGURE 1. For controlling the operation of the electrical switch 142 there is provided a source of alternating current 150. This may be an oscillator but very conveniently is an alternating current mains supply. This alternating current serves as a frequency standard for the switching of the electronic switch 142 at the transmitting apparatus and also, as described below, as a frequency standard for a corresponding switch in the receiver. In the transmitter the output of the oscillator is fed to a drive circuit 151 for providing drive impulses for a gas filled counting tube 152 which may conveniently be the type of tube known under the name "Dekatron." Such a tube has a plurality of cathodes and, by the application of two drive pulses, a discharge can be re-set from one cathode to the next. The tube can thus be used to effect a number of circuit connections in sequence at a rate controlled by input signals from the alternating current source 150. The various cathodes of the counting tube 152 are arranged to control in succession four bi-stable multivibrator circuits 153 to 156 (conveniently Eccles-Jordan circuits) which produce, in succession, square wave signals for effecting the necessary switching of the electronic switch 142.

The output from the terminal 149 will thus consist of a sequence of groups of alternating current signals, the frequencies of the various groups corresponding to the direct voltages on the input leads 140 and these groups occurring in sequence in synchronism with the switching under the control of the alternating current source 150. This output from the terminal 149 is illustrated in FIGURE 6B as being fed by means of a transmission line 160 to a receiver 161 for converting these alternating currents into direct voltages. This receiver comprises a low-pass filter 162 feeding a variable gain amplifier 163 the output of which is applied to a squaring circuit 164 which triggers a flip-flop 165. This flip-flop produces short duration impulses of which the trailing edge triggers a further flip-flop 166 producing short duration output impulses for cutting off and re-starting a saw-tooth generator 167. The components 162 to 167 respectively correspond to the components 44, 45, 46, 60, 75 and 76 of FIGURE 3 and therefore will not be described in further detail. It will be recollected that in FIGURE 3 the first flip-flop had also an output circuit for controlling a pulse sampling demodulator. In the arrangement of FIGURE 6B, an output from the flip-flop 165 is fed to distributor 168, which may be an electronic switching device and which serves to feed the impulses from the flip-flop 165 to four circuits 169 to 172 in succession under the control of switching impulses. These switching impulses are illustrated as being derived from the alternating current sources 150 at the transmitter by means of a line 173 which feeds this alternating current to a drive circuit 174 for a gas filled counting tube 175 which may conveniently be a "Dekatron" tube. This tube 165 controls the sequential operation of four bi-stable multivibrators 176 to 179 (conveniently Eccles-Jordan circuits) providing the necessary gating waveforms for the distributor 168. If an alternating current mains supply is used as the source 150 and if the transmitter and receiver operate on synchronised main supply sources, it will be appreciated that there is no need for any line 173 between the transmitter and receiver as the transmitter and receiver may each make use of the alternating current main supply to provide the necessary synchronisation of the switching. The impulses which are switched in sequence over the four leads 169 to 172 are fed by these four leads respectively to four pulse sampling demodulators 180 to 183 which may be similar to the pulse sampling demodulator 63 of FIGURE 3 and which each serve in sequence to sample the output waveform from the saw-tooth generator 167. These demodulators might be arranged directly to sample the output waveform from the saw-tooth generator 167 but, in the arrangement of FIGURE 6B, there is provided a fast pulse sampling demodulator 184, which may be similar to the pulse sampling demodulator 63 of FIGURE 3 and which samples the output from the saw-tooth generator 167 directly under the control of the sampling pulse from the flip-flop 165 to provide a direct voltage output which will change its level in accordance with the frequencies in each group of the alternating input signals to the receiver. The four pulse sampling demodulators 180 to 183 are then arranged to sample the output from the demodulator 184. By providing this extra demodulator 184, the demodulators 180 to 183 can be arranged to sample the output only during the middle of each group of saw-tooth waveforms by suitable timing of the waveforms produced by the bi-stable multivibrators 176 to 179. The demodulators 180–183 need not therefore be synchronised to sample every saw-tooth waveform but only each group of waveforms thereby avoiding any possibility of erroneous outputs being obtained due to faulty synchronisation causing sampling by one of the demodulators of a saw-tooth waveform belonging to either a previous or a following group. It will be seen that the demodulators 180 to 183 will provide four separate direct voltage outputs corresponding to the four alternating input voltages applied to the transmitter over leads 140. These outputs are illustrated as being applied to interscan drive circuits 190, 191 connected to the orthogonal deflector means of a display cathode ray tube 192. The interscan drive circuits 190, 191 may be similar to the units 130, 131 in the radar apparatus and thus the display tube 192 will display interscan markers corresponding to those on the display tube 117 of the radar apparatus.

If desired automatic control means may be provided for ensuring that the electronic switch 142 and the distributor 168 operate in synchronism to switch the appropriate signals to the appropriate channels. In one arrangement for this purpose, a direct voltage signal outside the normal amplitude range of the required signals to be transmitted and which would therefore be transmitted as a frequency outside the normal frequency range, may be sent from the transmitting station to the receiving station. Since this synchronising signal is outside the normal frequency range it is separable by filters from the other signals and, after such separation at the receiver, may be applied as a re-setting pulse to a particular cathode of the counting tube 175 at the receiver. Such a re-setting pulse may be sent out once in each cycle of operation of the cathodes of the counting tube to put the counting tube back into step if, for any reason, it should have got out of step. FIGURE 7 illustrates one example of the multiplex waveform from a saw-tooth generator which might be used for this purpose. It will be seen that the saw-tooth signals occur in groups having amplitudes and hence frequencies corresponding to five different levels of direct voltage input. The lowest frequency group of signals, that is to say the signals having the maximum amplitude, which are illustrated as saw-tooth waveforms 200, may be used as the synchronising signals whilst the other saw-tooth signals illustrated typically by the four different waveforms 201, 202, 203, 204 provide the four different direct voltage levels to be transmitted. Such a waveform may be produced as illustrated in FIGURE 8 which is a diagram illustrating a modification of part of the transmitting equipment of FIGURE 6A. In FIGURE 8 there are four input leads 140 to the electronic switch 142 as before and also a fifth input lead 210 which is connected to a source of reference potential indicated diagrammatically by potentiometer 211 which provides a reference potential greater than the maximum amplitudes of any of the four direct voltages to be transmitted. The switching sequence of the switch 142 is controlled by five bi-stable multivibrators, that is to say the four mutlivibrators 153 to 156 of FIGURE 6A and a fifth multivibrator 212 under the control of the counting tube 152. The output from the electronic switch may then be fed to the comparator 144 exactly as in FIGURE 6A to produce the required waveform illustrated in FIGURE 7. FIGURE 9 illustrates a method of employing this waveform at the receiver differing from that described. In FIGURE 9 which is a diagram illustrating a modification of part of the receiver of FIGURE 6B the output from the fast pulse sampling demodulator 184 is fed to a comparator 220 which compares the output voltage sampled by the demodulator 184 with that derived from a reference source indicated diagrammatically by a potentiometer 221 and produces an output signal when output from the demodulator 184 and hence the saw-tooth voltage exceeds the level of the reference voltage from potentiometer 221. This reference voltage is set so that only the synchronising signals 200 of FIGURE 7 would cause any output from the comparator 220. This output from the comparator 220 is fed as a re-setting impulse of the counting tube 175. Such an arrangement may be used where an alternating current mains supply is used as the source for synchronising the switching at the transmitter and the distribution at the receiver. In FIGURE 9, however, there is illustrated diagrammatically a double triode valve arranged as a resistance-capacity coupled variable frequency oscillator which is tuned by a variable resistor 223 to oscillate approximately in synchronism with the frequency of the source at the transmitter. This oscillator is illustrated only diagrammatically since the construction of such an oscillator is well known. The output from the comparator 220 is fed as synchronising pulses to this oscillator to lock the frequency of the oscillator to the frequency of the alternating current at the transmitting end. A similar oscillator, apart from the synchronising circuit may conveniently be used at the transmitter if an oscillator is required as the source of alternating current for controlling the switching. Such synchronising of a local oscillator at the receiver by a comparator can only be effective to an accuracy of the time interval corresponding to one of the saw-tooth waveforms 200 of FIGURE 7. This time interval is greater than the duration of the saw-tooth waveforms representative of the required direct voltages and hence errors of a saw-tooth cycle of the required signals may occur but any such small errors do not affect the output signals since the fast pulse-sampling demodulator 184 in the receiver permits sampling to be effected to give the separate outputs in the centre of each group of saw-tooth waveforms.

We claim:

1. Apparatus for recording and reproducing information represented by a direct voltage of varying magnitudes comprising a sawtooth generator arranged, on application of a control signal, to produce a sawtooth signal the amplitude of which increases from a datum at a predetermined rate, comparator means coupled to said sawtooth generator to compare the voltage to be converted with the sawtooth generator output voltage and to produce a control signal when the compared voltages are in a predetermined relationship, means for applying said control signal to said sawtooth generator to cut-off and re-start said sawtooth generator when a control signal is produced, means for converting the sawtooth output of the sawtooth generator in to a substantially sinusoidal waveform, a recorder for recording the converted sawtooth output, a reproducer for reproducing the recorded signals, and a receiver coupled to said reproducer and having means responsive to the frequency of the input signals to the receiver to re-convert these signals to a direct voltage dependent on the frequency of the input signals.

2. Apparatus for converting information represented by a direct voltage of varying magnitude into an alternating voltage having a frequency representative of the amplitude of the direct voltage comprising a saw-tooth generator arranged, on application of a control signal, to produce a saw-tooth signal the amplitude of which increases from a datum at a pre-determined rate, comparator means coupled to said saw-tooth generator to compare the voltage to be converted with the saw-tooth generator output voltage and to produce a control signal when the compared voltages are in a pre-determined relationship, means for applying said control signal to said saw-tooth generator to cut-off and re-start said saw-tooth generator when a control signal is produced, and means, including a low-pass filter, responsive to said control signal to produce a sinusoidal waveform of a frequency proportional to the repetition frequency of said sawtooth output, a transmission circuit to which the variable frequency output of said saw-tooth generator is fed, and a receiver connected to said transmission circuit to receive the variable frequency signals and having means responsive to the frequency of the input signals to the receiver to re-convert these signals to a direct voltage dependent on the frequency of input signals.

3. Apparatus as claimed in claim 2 wherein said receiver comprises an integrator producing a sawtooth waveform the amplitude of which increases from a datum at a predetermined rate, means for controlling the sawtooth repetition frequency in accordance with the frequency of the alternating input signals and circuit means providing an output representative of the peak voltage of the integrator output.

4. Apparatus as claimed in claim 2 wherein said receiver comprises a shaping circuit for converting the receiver input signals into repetitive pulses synchronised with the frequency of the input signals, an integrator producing a saw-tooth waveform the amplitude of which increases from a datum at a predetermined rate, switch means for said integrator controlled by the repetitive pulses so that said integrator produces waveforms increasing to a potential dependent on the frequency of the input signals and a pulse sampling demodulator providing an output representative of the peak voltage of the integrator output.

5. Apparatus for converting an alternating voltage input signal of a varying frequency into a direct voltage of a magnitude representative of the frequency of the input signal comprising a shaping circuit for converting the input signal into repetitive pulses synchronised with the frequency of the input signal, an integrator producing a saw-tooth waveform the amplitude of which increases from a datum at a predetermined rate, switch means for said integrator controlled by the repetitive pulses to cut-off and re-start the integrator in response to each of said pulses so that the integrator produces waveforms synchronized with said repetitive pulses and increasing to a potential dependent on the frequency of the input signal, and a pulse sampling demodulator providing an output representative of the peak voltage of the integrator output.

6. Apparatus as claimed in claim 5 wherein said shaping circuit comprises a squarer to convert the input signals into a rectangular waveform, a first self-timing monostable flip-flop triggered by the leading or trailing edge of the rectangular waveform to produce a short duration pulse for controlling the pulse sampling demodulator and a second self-timing monostable flip-flop triggered by the trailing edge of the output pulse of the first flip-flop for cutting off and re-starting the integrator.

7. Apparatus for converting information represented by a direct voltage of varying magnitude into an alternating voltage having a frequency representative of the amplitude of the direct voltage comprising a linear saw-tooth generator arranged, on application of a control signal, to produce a saw-tooth signal the amplitude of which increases from a datum at a pre-determined rate, comparator means coupled to said saw-tooth generator to compare the voltage to be converted with the saw-tooth generator output voltage and to produce a control signal when the compared voltages are in a pre-determined relationship, means for applying said control signal to said saw-tooth generator to cut-off and re-start the saw-tooth generator when a control signal is produced, and means, including a low-pass filter, responsive to said control signal to produce a sinusoidal waveform of a frequency proportional to the repetition frequency of the sawtooth waveform.

8. Apparatus for converting information represented by a direct voltage of varying magnitude into an alternating voltage having a frequency representative of the amplitude of the direct voltage comprising a high gain amplifier with a capacitive feedback connection from the amplifier output to the amplifier input and a resistive input circuit, a source of reference voltage connected to said resistive input whereby the amplifier forms a linear saw-tooth generator producing a saw-tooth signal the amplitude of which increases from a datum at a rate dependent on said reference voltage, a control circuit for stopping and re-starting the saw-tooth output of said amplifier on application of a control signal, comparator means coupled to said amplifier output to compare the voltage to be converted with the amplifier output voltage and to produce said control signal when the compared voltages are in a pre-determined relationship, means coupling said comparator circuit to said control circuit to apply said control signal to said amplifier, and means, including a low-pass filter, responsive to said control signal to produce a sinusoidal waveform of a frequency proportional to the repetition frequency of said sawtooth output.

9. Apparatus for converting information represented by a direct voltage of varying magnitude into an alternating voltage having a frequency representative of the amplitude of the direct voltage comprising a saw-tooth generator arranged, on application of a control signal, to produce a saw-tooth signal the amplitude of which increases from a datum at a pre-determined rate, comparator means coupled to said saw-tooth generator to compare the voltage to be converted with the saw-tooth generator output voltage and to produce a control signal when the compared voltages are in a pre-determined relationship, means for applying said control signal to said saw-tooth generator to cut-off and re-start said saw-tooth generator when a control signal is produced, a bi-stable multivibrator arranged to produce rectangular waveform output pulses, means for applying said control signals to said multivibrator to synchronize the rectangular waveform output with said control pulses, and a low-pass filter connected to said bi-stable multivibrator for producing a substantially sinusoidal waveform of frequency which is half the saw-tooth repetition frequency.

10. Apparatus as claimed in claim 9 wherein said means for applying said control signal to said saw-tooth generator comprises a monostable flip-flop triggered by the control pulses from said comparator.

11. Apparatus as claimed in claim 10 wherein said means for applying said control signals to said multivibrator comprises a circuit for applying impulses from said monostable flip-flop as trigger impulses to said multivibrator.

12. Means for transmitting information represented by a plurality of direct voltages of varying magnitudes comprising a sawtooth generator arranged, on application of a control signal, to produce a sawtooth signal the amplitude of which increases from a datum at a predetermined rate, comparator means coupled to said sawtooth generator to compare a voltage to be transmitted with the sawtooth generator output voltage and to produce a control signal when the compared voltages are in a predetermined relationship, means for applying said control signal to said sawtooth generator to cut-off and re-start said sawtooth generator when a control signal is produced, means for converting the sawtooth output of the sawtooth generator into a substantially sinusoidal waveform, switching means for applying in sequence to the comparator each of the direct voltages representing information to be transmitted, a transmission line connected to said converting means for transmitting the sequence of alternating current outputs of said converting means, receiving means connected to said transmission line for re-converting the transmitted signals to direct voltages, a plurality of output channels, and a distributor coupling said receiving means to said output channels, said distributor being operated in synchronism with said switching means so that the direct voltages are fed to said output channels in sequence to provide separate outputs representative of the various signals being transmitted.

13. Means for transmitting information represented by a plurality of direct voltages of varying magnitudes comprising a converter for converting direct voltage information into alternating voltages having a frequency representative of the amplitude of the direct voltage, switching means for applying each of the direct voltages in sequence to said converter, a transmission line connected to said converter for transmitting the sequence of alternating current outputs, a shaping circuit connected to said transmission line for converting the received signals into repetitive pulses synchronized with the frequency of the transmitted signals, an integrator producing a sawtooth waveform the amplitude of which increases from a datum at a predetermined rate, switch means for said integrator coupled to said shaping circuit to be controlled by the repetitive pulses so that said integrator produces waveforms increasing to a potential dependent on the frequency of the input signals, circuit means connected to said integrator providing an output representative of the peak voltage of the integrator output, a plurality of output channels, and a distributor coupling said circuit means to said output channels, said disributor being operated in synchronism with said switching means so that said outputs representative of the peak voltages are fed to said output channels in sequence to provide separate outputs representative of the various signals being transmitted.

14. Information transmitting means as claimed in claim 12 wherein means are provided for transmitting over said transmission line a distinctive signal, separable from the other signals, for synchronizing the switching operation of the distributor with the switching of said switching means.

References Cited in the file of this patent

UNITED STATES PATENTS

| | | |
|---|---|---|
| 1,313,483 | Heising | Aug. 19, 1919 |
| 2,098,956 | Dudley | Nov. 16, 1937 |
| 2,352,634 | Hull | July 4, 1944 |
| 2,400,950 | Purington | May 28, 1946 |
| 2,407,684 | Roberts | Sept. 17, 1946 |
| 2,408,692 | Shore | Oct. 1, 1946 |
| 2,437,970 | Reich | Mar. 16, 1948 |
| 2,496,148 | Butts | Jan. 31, 1950 |
| 2,527,649 | Peterson | Oct. 31, 1950 |
| 2,564,687 | Guenther | Aug. 21, 1951 |
| 2,640,973 | Cleaver et al. | June 2, 1953 |
| 2,708,738 | Hathaway | May 17, 1955 |
| 2,712,128 | Woodruff | June 28, 1955 |
| 2,736,007 | Kenyon | Feb. 21, 1956 |
| 2,802,056 | Affrunti | Aug. 6, 1957 |
| 2,839,727 | Lozier | June 17, 1958 |
| 2,883,650 | Brockway | Apr. 21, 1959 |

FOREIGN PATENTS

| | | |
|---|---|---|
| 136,815 | Australia | Sept. 9, 1946 |